United States Patent [19]
Lii et al.

[11] Patent Number: 6,139,456
[45] Date of Patent: Oct. 31, 2000

[54] BICYCLE SPROCKET

[76] Inventors: Jia-Miin Lii, No. 3, Lane 77, Long-Feng St.; Simon Chang, No. 3, Lane 921, San-Feng Rd., both of Feng-Yuan City, Taichung County, Taiwan

[21] Appl. No.: 09/229,559

[22] Filed: Jan. 13, 1999

[51] Int. Cl.[7] .................................................. F16H 55/30
[52] U.S. Cl. ........................ 474/152; 474/160; 474/158
[58] Field of Search .................................. 474/152, 160, 474/158, 78, 178, 164, 155, 116, 903, 165, 163; D12/123, 124

[56] References Cited

U.S. PATENT DOCUMENTS

| | | | |
|---|---|---|---|
| 4,813,916 | 3/1989 | Valin | 474/152 |
| 5,085,620 | 2/1992 | Nagano | 474/152 |
| 5,514,042 | 5/1996 | Liou | 474/160 |
| 5,545,096 | 8/1996 | Su | 474/160 |
| 5,782,712 | 7/1998 | Campagnolo | 474/152 |
| 5,935,033 | 8/1999 | Tseng et al. | 474/160 |

Primary Examiner—David A. Bucci
Assistant Examiner—Marcus Charles
Attorney, Agent, or Firm—Rosenberg, Klein & Lee

[57] ABSTRACT

A bicycle sprocket includes a number of annularly equidistant teeth formed on an outer periphery thereof, the teeth on the sprocket being diametrically symmetrically formed. The sprocket includes two diametrically disposed easy-to-engage teeth. The sprocket further includes two diametrically symmetrical guiding surfaces formed on an outer side thereof. Each guiding surface extends over at least two teeth and includes an end merges with an associated easy-to-engage tooth. Each easy-to-engage tooth includes a right side with a concave surface and a sloped left side when viewed from the outer side of the sprocket, thereby forming a sharp end between the right side and the left side. One of the teeth covered by each guiding surface and most adjacent to an associated easy-to-engage tooth has a height lower than that of the remaining teeth on the sprocket and has a second concave surface on a right side thereof for engaging with one of a number of roller pins of a chain to be engaged with the sprocket.

2 Claims, 7 Drawing Sheets

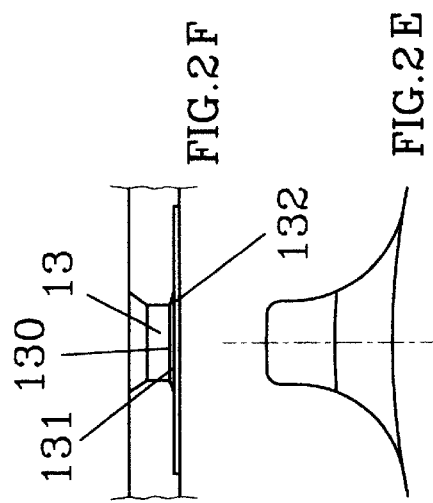
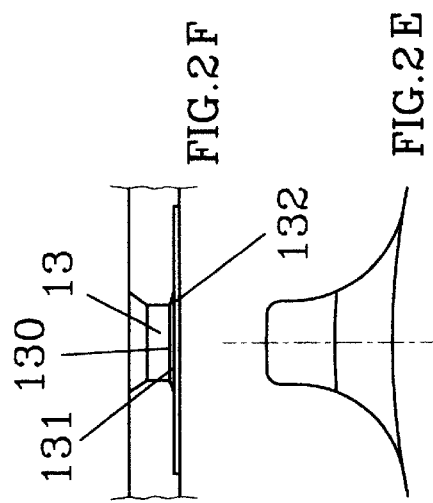
FIG.2B
FIG.2A
FIG.2D
FIG.2C
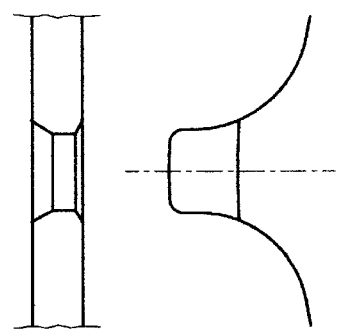
FIG.2F
FIG.2E
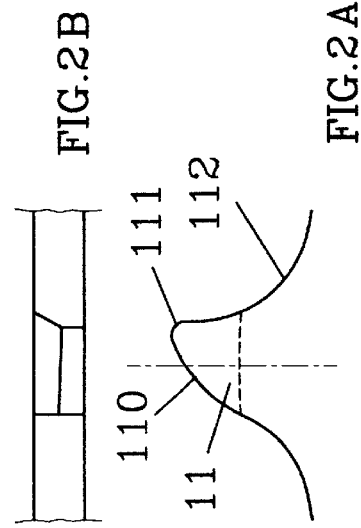
FIG.2H
FIG.2G
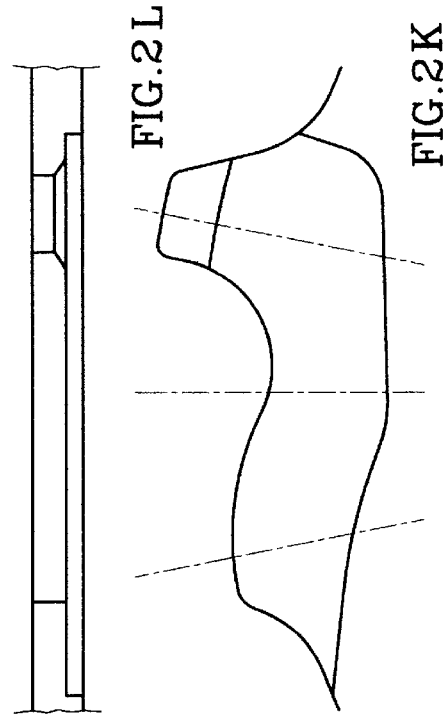
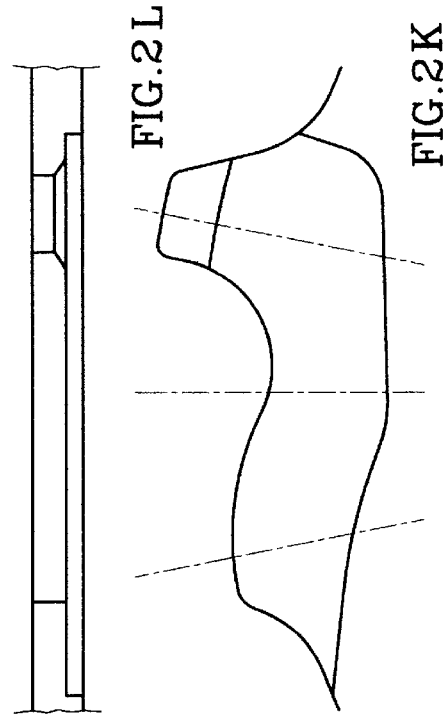
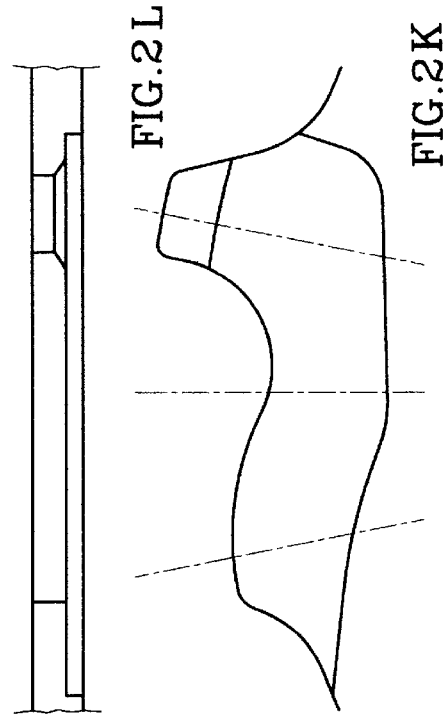
FIG.2J
FIG.2I
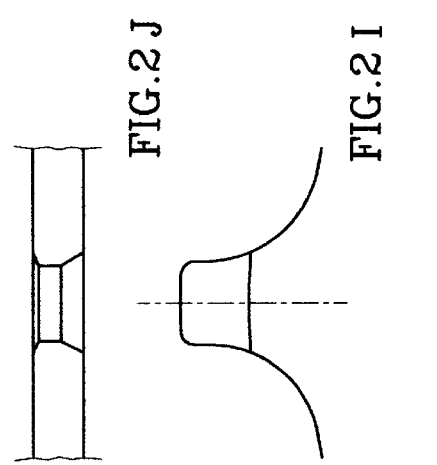
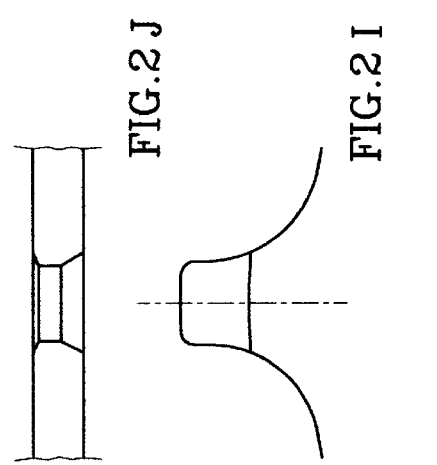
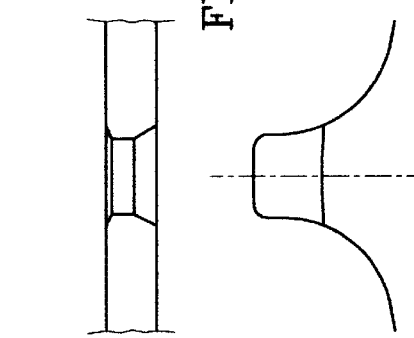
FIG.2L
FIG.2K
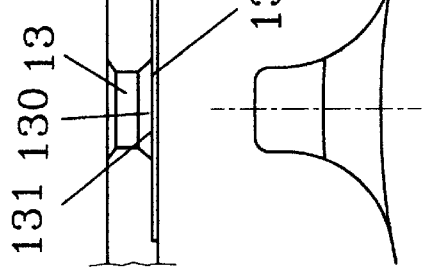

BICYCLE SPROCKET

BACKGROUND OF THE INVENTION

1. Field of the Invention

The present invention relates to a bicycle sprocket, and more particularly to a sprocket for gearshift.

2. Description of the Related Art

FIG. 6 of the drawings illustrates a typical sprocket 20 having a number of annularly equidistant teeth 21, 22, 23. Two guiding surfaces 24 are diametrically provided on an outer side of the sprocket 20 and each extends over several teeth 22. Each guiding surface 24 has an end merges with a so-called easy-to-engage tooth 21. FIG. 7 shows a top view of the easy-to-engage tooth 21 that has a substantially rectangular crest 210. One of the teeth 22 covered by the guiding surface 24 and adjacent to the tooth 21 has a height identical to the remaining teeth 22. As a result, during gearshift from one sprocket to another, engagement of a chain with the sprocket 20 is obstructed by said one tooth 22 adjacent to the tooth 21. In order to solve this problem, an inner right section 211 of the crest 210 is beveled to form a quadrilateral. Thus, the right side of the tooth 21 is made thinner to allow smooth engagement of the chain onto the sprocket 20.

However, the beveling process may damage the inner right section 211 of the tooth 21 that is originally very thin. In addition, the left side of the easy-to-engage tooth 21 is not cut properly such that if an outer link plate of a chain is used to proceed with gearshift, an inner link plate on the right of the outer link plate has not moved across the tooth 21 when the outer link plate bears against a concave surface 212 on the right side of the tooth 21. As a result, the inner link plate of the chain will impinge on the left section of the tooth 21 when the inner link plate moves across the tooth 21. Such movement is not smooth and noise is generated. Furthermore, the tooth 22 located on the right side of the tooth 21 is not properly cut. When the inner link plate of a chain is used to proceed with gear shift, an end of the outer link plate on the left of the inner link plate bears against the concave surface on the right side of the tooth 21. In this case, the outer link plate of the chain has not moved across the tooth 21 As a result, the outer link plate of the chain will impinge on the tooth on the right side of the tooth 21 when the outer link plate moves across the tooth 21. Again, such movement is not smooth and noise is generated. Moreover, each tooth 23 has a beveled surface 230 that extends downwardly from the crest of the tooth 23. The portion below the beveled surface 230 has a thickness the same as that of the sprocket 20. However, the chain is slightly twisted during the gearshift. Two adjacent sprockets have a small distance therebetween, such that the chain will contact with the second tooth to the fourth tooth (depending on the number of the teeth of the sprocket) counting from the tooth 21 of the sprocket to be engaged. Again, such movement is not smooth and noise is generated.

The present invention is intended to provide an improved sprocket that mitigates and/or obviates the above problems.

SUMMARY OF THE INVENTION

It is a primary object of the present invention to provide a sprocket that allows smooth operation during gearshift to lower noise generated.

A bicycle sprocket in accordance with the present invention comprises a plurality of annularly equidistant teeth formed on an outer periphery thereof. The sprocket includes two diametrically disposed easy-to-engage teeth. The sprocket further includes two diametrically opposed guiding surfaces formed on an outer side thereof. Each guiding surface extends over at least two teeth and includes an end merges with an associated easy-to-engage tooth. Each easy-to-engage tooth includes a right side with a concave surface and a sloped left side when viewed from the outer side of the sprocket, thereby forming a sharp end between the right side and the left side. One of the teeth covered by each guiding surface and most adjacent to an associated easy-to-engage tooth has a height lower than that of the remaining teeth on the sprocket and has a second concave surface on a right side thereof for engaging with one of a number of roller pins of a chain to be engaged with the sprocket.

At least one of a third tooth and a fourth tooth counting from each said easy-to-engage tooth includes a beveled surface adjacent to the outer side of the sprocket, and a recess extends from the beveled surface toward a center of the sprocket to reduce the thickness of the sprocket by the recess.

Other objects, advantages, and novel features of the invention will become more apparent from the following detailed description when taken in conjunction with the accompanying drawings.

BRIEF DESCRIPTION OF THE DRAWINGS

FIG. 2A is an enlarged front view of tooth A in FIG. 1;

FIG. 2B is a top view of tooth A;

FIG. 2C is an enlarged front view of tooth B in FIG. 1;

FIG. 2D is a top view of tooth B;

FIG. 2E is an enlarged front view of tooth C in FIG. 1;

FIG. 2F is a top view of tooth C;

FIG. 2G is an enlarged front view of tooth D in FIG. 1;

FIG. 2H is a top view of tooth D;

FIG. 2I is an enlarged front view of tooth E in FIG. 1, wherein tooth F and tooth G have identical configurations;

FIG. 2J is a top view of tooth E, wherein tooth F and tooth G have identical configurations;

FIG. 2K is an enlarged front view of tooth H and tooth I in FIG. 1;

FIG. 2L is a top view of tooth H and tooth I;

DETAILED DESCRIPTION OF THE PREFERRED EMBODIMENT

Figure 1:
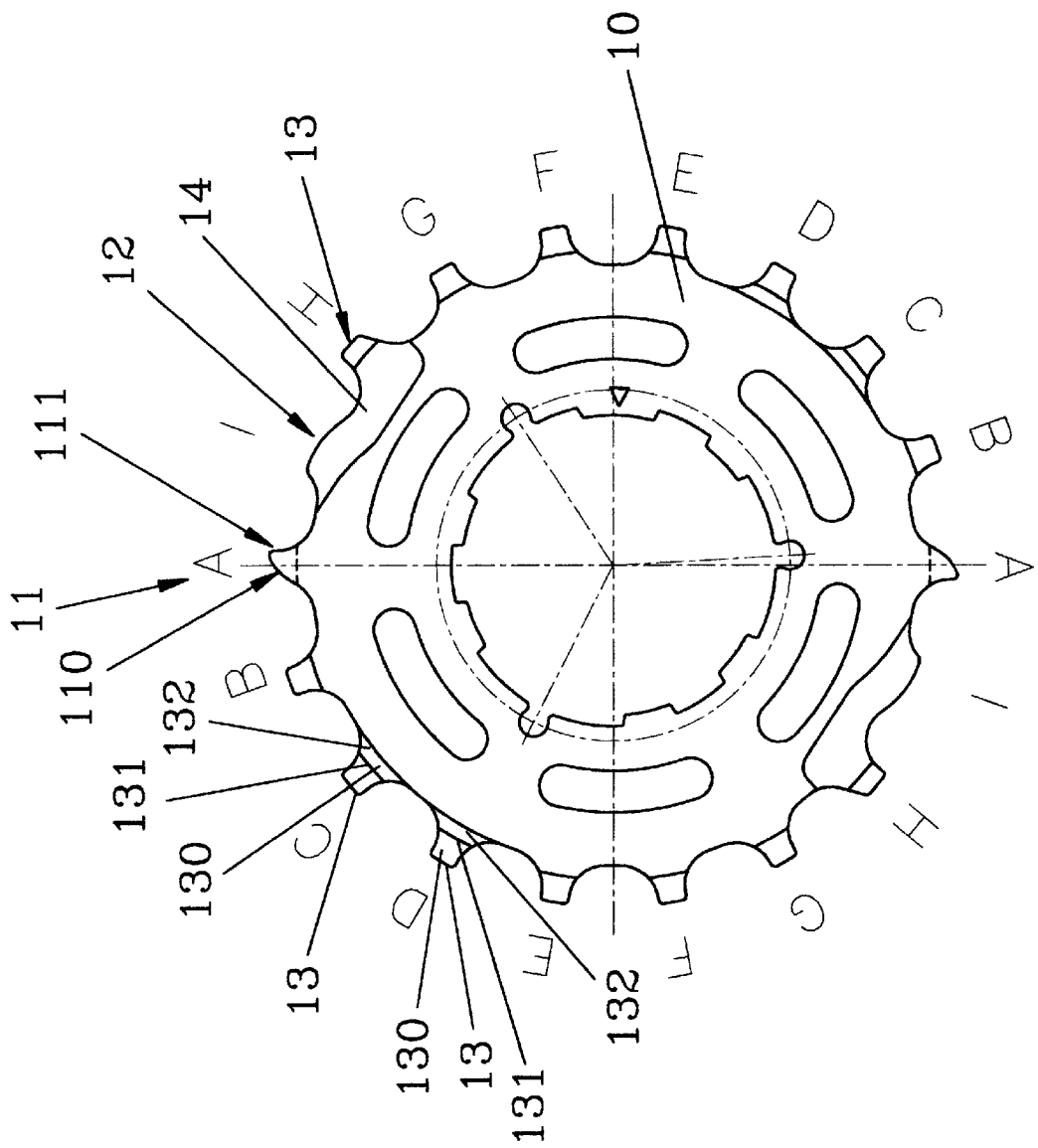
FIG. 1 is a front view of a sprocket in accordance with the present invention.

Referring to FIG. 1 and FIGS. 2A to 2L, a sprocket 10 in accordance with the present invention generally includes a number of annularly equidistant teeth 11, 12, 13 formed on an outer periphery thereof. The teeth on the sprocket 10 are diametrically formed. The sprocket 10 has two diametrically opposed guiding surfaces 14 formed on an outer side thereof. Each guiding surface 14 extends over several (at least two) teeth 12 and includes an end merges with an associated easy-to-engage tooth 11. The easy-to-engage tooth 11 has a sloped left side 110, thereby forming a sharp end 111, best shown in FIGS. 2A and 2B. The left side of each tooth 11 includes a concave surface 112 to allow low-noise smooth engagement with a chain to be engaged with the sprocket 10. The processing for the tooth 11 is easy to accomplish, and the deficient index of products and the manufacture cost are reduced. Referring to FIGS. 1, 2K, and 2L, the tooth 12 covered by the guiding surface 14 and adjacent to the tooth 11 has a reduced height. In addition, the tooth 12 has a concave surface on a right side thereof to allow low-noise smooth engagement with one of a number of roller pins (not shown) of the chain to be engaged with the sprocket 10.

Referring to FIGS. 1, 2E, 2F, 2G, and 2H, at least one of the third tooth and the fourth tooth counting from each easy-to-engage tooth 11 includes a beveled surface 130 adjacent to the outer side of the sprocket 10. A recess 132 extends from the beveled surface 130 toward a center of the sprocket 10 to reduce the thickness of the sprocket 10 in this area. The reason for providing the beveled surface 130 and the recess 132 on the third tooth and/or the fourth tooth counting from the easy-to-engage tooth 11 is that the chain often engages with the third tooth and/or the fourth tooth on the sprocket during gearshift. This provides a smooth low-noise operation FIGS. 2C and 2D illustrate configuration of tooth B, while FIGS. 2I and 2J illustrate configuration of tooth E, F, G. It is appreciated that the configurations of all teeth are viewed from the front (outer) side of the sprocket 10.

Figure 3:
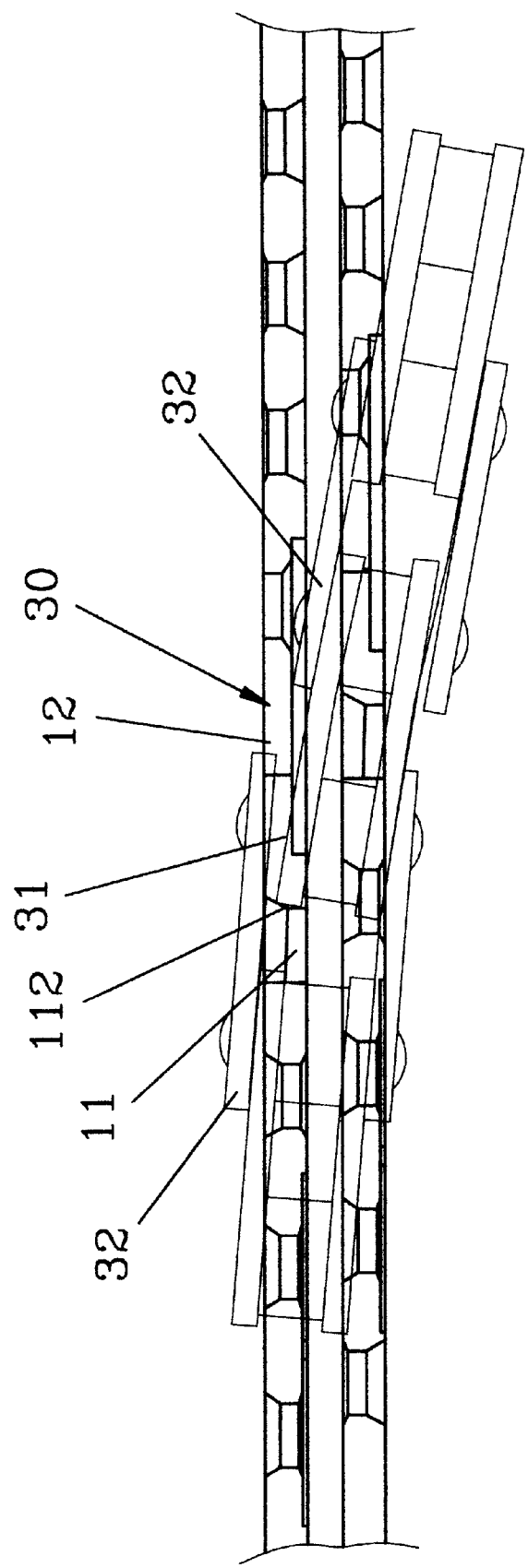
FIG. 3 is a top view illustrating gearshift by an inner link plate of a chain.
Figure 4:
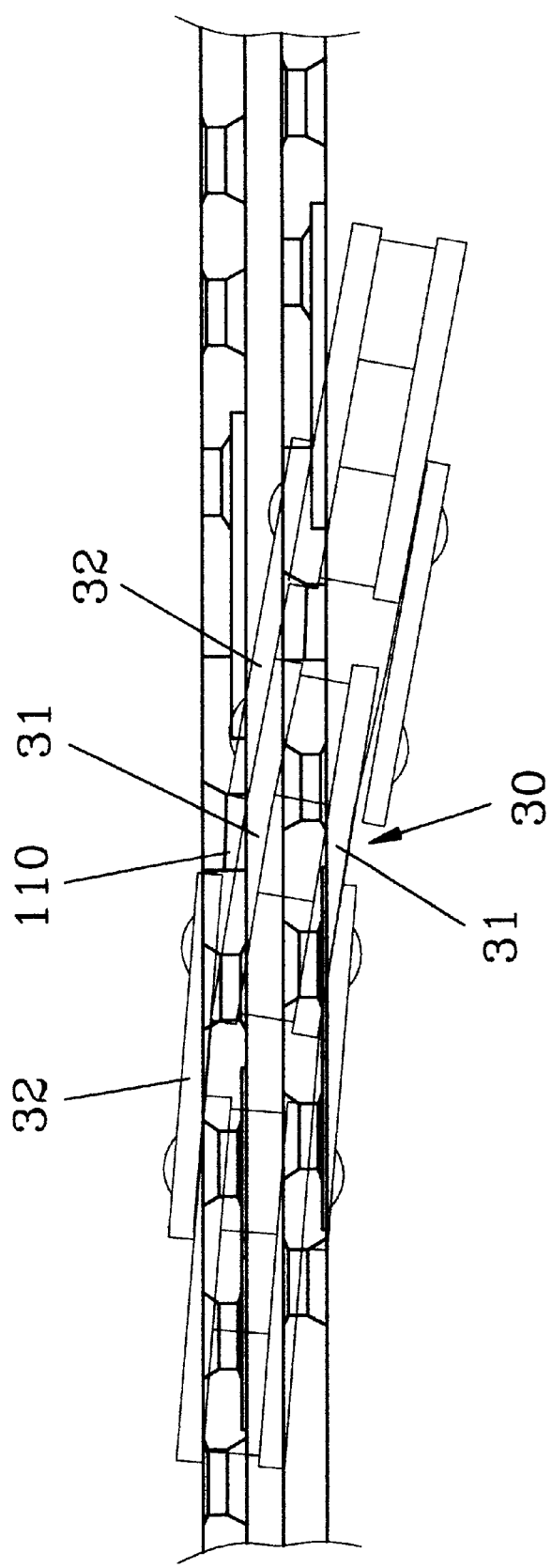
FIG. 4 is a top view illustrating gearshift by an outer link plate of a chain.
Figure 5:
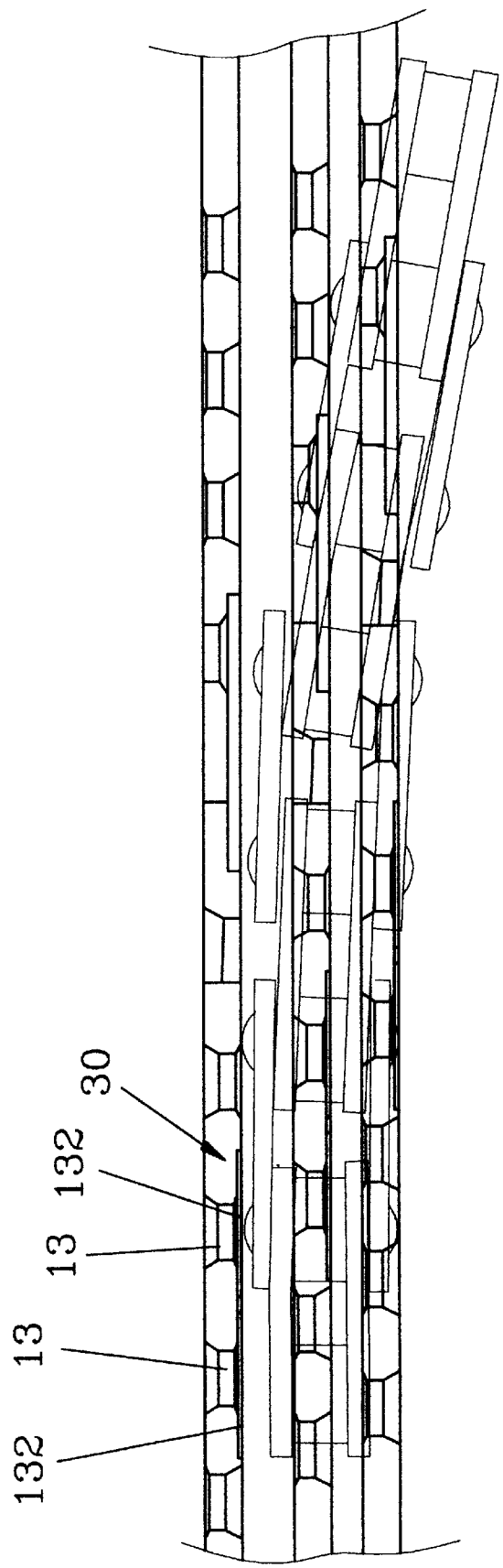
FIG. 5 is a top view illustrating another situation of gearshift.
Figure 6:
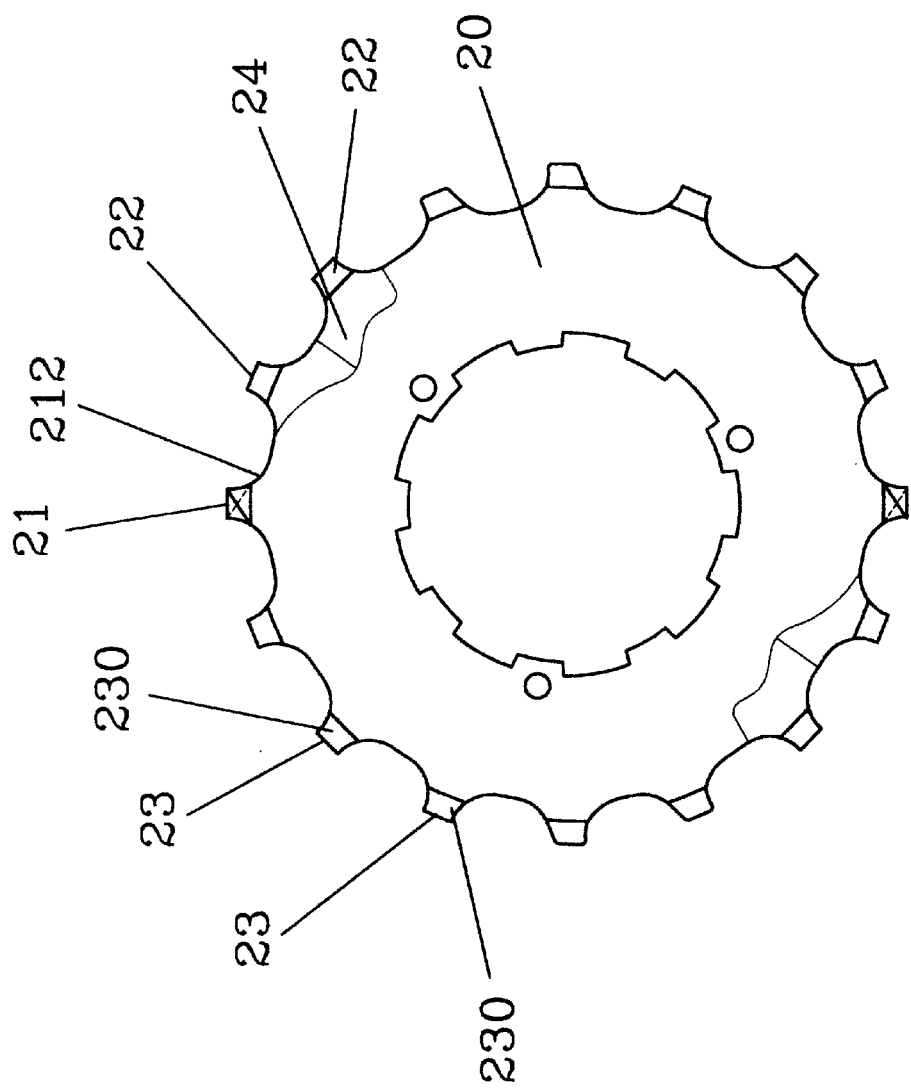
FIG. 6 is a front view of a conventional sprocket.
Figure 7:
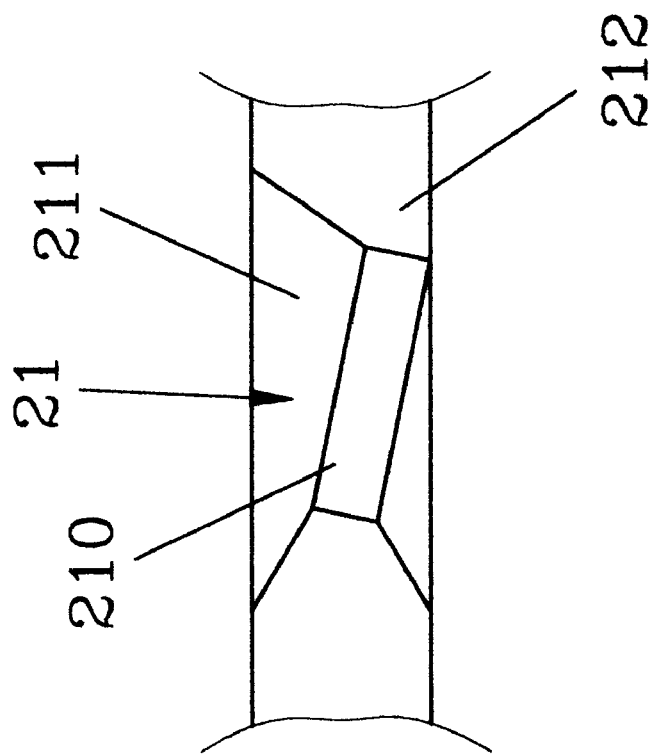
FIG. 7 is a top view of an easy-to-engage tooth of the conventional sprocket.

When gearshift is proceeded by means of moving a chain 30 from a sprocket to another sprocket, if an outer link plate is used to proceed with the gearshift, the outer link plate 32 bears against the concave surface 112 on the right side of the tooth 11, as shown in FIG. 4. This is because the left side of the tooth 11 is sloped (see FIG. 2A) and thus does not interfere with lateral movement (from one sprocket to another) of an inner link plate 31 on the left of the outer link plate 32. Thus, the gearshift is smoothly completed. Referring to FIG. 3, if the inner link plate 31 is used to proceed with gearshift, the inner link plate 31 bears against the concave surface 112 on the right side of the tooth 11. Since the tooth 12 adjacent to the tooth 11 is reduced in the height, lateral movement (from one sprocket to another) of the outer link plate 32 on the right of the inner link plate 31 is not obstructed. Referring to FIG. 5, if the chain 30 is lifted by the tooth 11 and is to about to fall down on the sprocket 10, the noise generated during engagement of the chain 30 and the sprocket 10 is reduced, as the third tooth and/or the fourth tooth 13 counting from the easy-to-engage tooth 11 is provided with the beveled surface 130 and the recess 132.

According to the above description, it is appreciated that the sprocket of the present invention can be easily manufactured and the cost is low, as the mold for the sprocket can be easily produced. Troublesome and unreliable processing in the conventional design is avoided. In addition, the gearshift can be smoothly completed with a low noise.

Although the invention has been explained in relation to its preferred embodiment, it is to be understood that many other possible modifications and variations can be made without departing from the spirit and scope of the invention as hereinafter claimed.

What is claimed is:

1. A bicycle sprocket comprising a plurality of annularly equidistant teeth formed on an outer periphery thereof, the sprocket including two diametrically opposed easy-to-engage teeth, the sprocket further including two diametrically opposed guiding surfaces formed on an outer side thereof, each said guiding surface extending over at least a two tooth span and including an end portion merging with an adjacent one of said easy-to-engage teeth, each said easy-to-engage tooth including a right side with a concave surface and a convex left side when viewed from an outer facing side of the sprocket and forming a sharp end between the right side and the left side, one pair of diametrically opposed teeth respectively spanned by said guiding surfaces and most adjacent to a corresponding one of said easy-to-engage teeth each having a height lower than that of the remaining teeth on the sprocket and having a second concave surface on a right side thereof adapted to engage with one of a number of roller pins of a chain to be engaged with the sprocket.

2. The bicycle sprocket as claimed in claim 1, wherein a pair of diametrically opposed third teeth and a pair of diametrically opposed fourth teeth respectively counting from a corresponding one of said easy-to-engage teeth each includes a beveled side surface in correspondence with the outer facing side of the sprocket, said sprocket having a respective recess associated with each said third and fourth tooth, each said recess extending from the beveled surface of a respective one of said third and fourth teeth toward a center of the sprocket to reduce the thickness of the sprocket in an area corresponding to the recess.

* * * * *